(12) United States Patent
Bhagavathula et al.

(10) Patent No.: US 8,982,999 B2
(45) Date of Patent: Mar. 17, 2015

(54) JITTER TOLERANT RECEIVER

(71) Applicant: Intel Corporation, Santa Clara, CA (US)

(72) Inventors: Kiriti Bhagavathula, El Dorado Hills, CA (US); Chunyu Zhang, Folsom, CA (US); Steven A. Peterson, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 13/632,082

(22) Filed: Sep. 30, 2012

(65) Prior Publication Data
US 2014/0092951 A1    Apr. 3, 2014

(51) Int. Cl.
| | | |
|---|---|---|
| *H03K 9/00* | (2006.01) | |
| *H04L 7/00* | (2006.01) | |
| *H04L 25/02* | (2006.01) | |
| *H04L 25/49* | (2006.01) | |
| *H04L 25/03* | (2006.01) | |

(52) U.S. Cl.
CPC .......... *H04L 7/0066* (2013.01); *H04L 25/0272* (2013.01); *H04L 25/0292* (2013.01); *H04L 25/03878* (2013.01); *H04L 25/4908* (2013.01)
USPC ........... 375/316; 375/361; 375/371; 327/165; 327/291

(58) Field of Classification Search
USPC .......................... 375/316, 355, 359, 361, 371; 327/165–166, 291; 326/52, 54, 93, 136
See application file for complete search history.

(56) References Cited

U.S. PATENT DOCUMENTS

| | | | | | |
|---|---|---|---|---|---|
| 4,347,498 | A | * | 8/1982 | Lee et al. | 370/408 |
| 4,592,072 | A | * | 5/1986 | Stewart | 375/282 |
| 5,245,635 | A | * | 9/1993 | Martinez et al. | 375/361 |
| 5,539,333 | A | * | 7/1996 | Cao et al. | 326/63 |
| 5,748,123 | A | * | 5/1998 | Lee | 341/70 |
| 5,880,898 | A | * | 3/1999 | Park | 360/51 |
| 5,928,293 | A | * | 7/1999 | Jobling et al. | 701/2 |
| 6,212,224 | B1 | * | 4/2001 | Cammarota et al. | 375/219 |
| 6,263,035 | B1 | * | 7/2001 | Maresca | 375/371 |
| 6,593,774 | B2 | * | 7/2003 | Li | 326/75 |
| 6,839,624 | B1 | * | 1/2005 | Beesley et al. | 701/468 |
| 6,987,824 | B1 | * | 1/2006 | Boerstler | 375/359 |
| 7,233,172 | B2 | * | 6/2007 | Kanamori et al. | 327/55 |
| 2001/0018751 | A1 | * | 8/2001 | Gresham | 713/401 |
| 2004/0217782 | A1 | * | 11/2004 | Brown | 327/108 |
| 2006/0171053 | A1 | * | 8/2006 | Sai et al. | 360/55 |
| 2008/0101450 | A1 | | 5/2008 | Wu et al. | |
| 2009/0307517 | A1 | * | 12/2009 | Fehr et al. | 713/500 |
| 2009/0323828 | A1 | * | 12/2009 | Sugita et al. | 375/257 |
| 2012/0242377 | A1 | * | 9/2012 | Yeung et al. | 327/110 |

\* cited by examiner

*Primary Examiner* — Jean B Corrielus
(74) *Attorney, Agent, or Firm* — Trop, Pruner & Hu, P.C.

(57) ABSTRACT

An embodiment of the invention includes a receiver with reduced error terms and incoming jitter tracking that improves jitter tolerance. An embodiment provides these benefits based on a voltage integrator that recovers data and clock information from incoming signals without use of a PLL, PI, CDR, and the like. An embodiment provides these benefits based on a time integrator that recovers, using digital logic, data and clock information from incoming signals without use of a PLL, PI, CDR, and the like. Other embodiments are described herein.

24 Claims, 14 Drawing Sheets

| Bit Length | p1/n1 | p2/n2 | p3/n3 | p4/n4 |
|---|---|---|---|---|
| 1 UI | 0 | 0 | 0 | 0 |
| 2 UI | 1 | 0 | 0 | 0 |
| 3 UI | 1 | 1 | 0 | 0 |
| 4 UI | 1 | 1 | 1 | 0 |
| 5 UI | 1 | 1 | 1 | 1 |

| Bit Length | p1/n1 | p2/n2 | p3/n3 | p4/n4 | p5/n5 |
|---|---|---|---|---|---|
| 1 UI | 1 | 0 | 0 | 0 | 0 |
| 2 UI | 1 | 1 | 0 | 0 | 0 |
| 3 UI | 1 | 1 | 1 | 0 | 0 |
| 4 UI | 1 | 1 | 1 | 1 | 0 |
| 5 UI | 1 | 1 | 1 | 1 | 1 |

FIG. 7

JITTER TOLERANT RECEIVER

BACKGROUND

High speed receivers (Rx) must typically be able to account for jitter. Jitter may be present in data (e.g., through channel loss and/or intersymbol interference (ISI)) the Rx receives and may also be induced by components within the Rx itself. Such jitter inducing Rx components may include a phase-locked loop (PLL), a clock-tree or clock hub, a phase interpolator (PI), clock-and-data recovery (CDR) logic components, and the like. In typical eye-tracking architecture Rx clock jitter (e.g., arising from a PLL, clock distribution, and/or PI) is a significant portion of the Rx's jitter eye budget. (Note: An "eye" diagram provides an intuitive view of jitter and is a composite view of multiple bit periods of a captured waveform superimposed upon each other.)

Conventional eye-tracking architecture has relatively low power requirements and relatively decent jitter tolerance. An example of such architecture is included in FIG. 1, where four-phases of clock signals (PH1, PH2, PH3, PH4) are generated from PLL 105 and sent to different lanes via clock tree/hub 110. The phase of these clocks is then adjusted via PI 115 before logic 100 samples incoming data (DP, DN) via samplers 116, 117, 118, 119. The phases of the output from PI 115 are controlled via CDR 120. CDR 120 generates the advancement or retardation of the phases of E1, D1, E2, D2 by looking at both edge and data output coming from samplers (E1, D1, E2, D2) and then modifying the output from CDR 120 accordingly to correct phase/timing issues via PI 115. Based on this closed feedback loop (which includes CDR 120), PI 115 output clocks track the center and edge of incoming data DP, DN to compensate for jitter.

BRIEF DESCRIPTION OF THE DRAWINGS

Features and advantages of embodiments of the present invention will become apparent from the appended claims, the following detailed description of one or more example embodiments, and the corresponding figures, in which:

FIGS. 5-7 illustrate a time derivative Rx architecture in an embodiment of the invention.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

At times herein descriptions cover several different figures at once. For clarity, figures include components where the most significant value denotes the figure that includes the component (e.g., element 3XX would be found in FIG. 3 and element 4XX would be found in FIG. 4).

Figure 1:
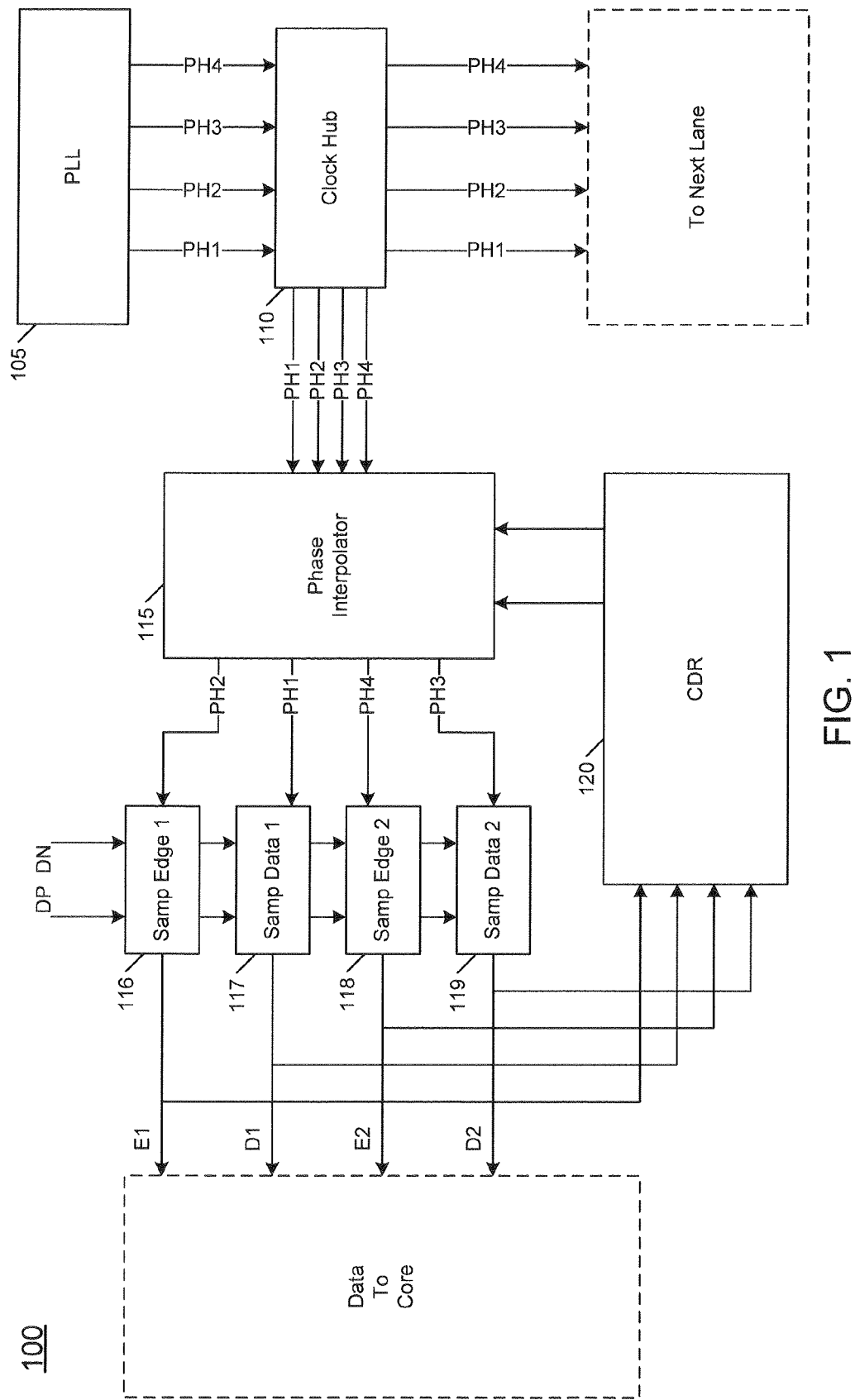
FIG. 1 illustrates a conventional Rx architecture for addressing jitter.

The system of FIG. 1 suffers from random and static error effects (sometimes referred to herein as "effects") that are generated from, for example, PLL 105, clock-tree or hub 110, PI 115, and latency associated the closed feedback loop of CDR 120. A significant portion of jitter from system 100 comes from process mismatch factors (e.g., between components of system 100) and supply noise, both of which get worse with sub-micron technologies. Also system 100 is limited in its ability to track very high frequency jitter as latency of CDR 120 feedback loop is high. For example, system 100 is limited to tracking jitter of less than 50 MHz. Thus, the eye-diagram, which extends over several unit intervals (UI), needs to be taken into account when measuring jitter tolerance. (UI is the minimum time interval between condition changes of a data transmission signal, also known as the pulse time or symbol duration time.) This eye-diagram includes an accumulation of jitter and is much worse, in terms of jitter, than an individual UI at any given time. In other words, managing jitter over many UI is more difficult and less effective than managing jitter one UI at the time.

An embodiment manages jitter one UI (or a few UI) at the time instead of over many UI as with conventional Rx architectures. An embodiment includes an Rx with reduced error terms and improved jitter tracking, both of which improve jitter tolerance. An embodiment provides these benefits based on a voltage integrator that recovers data and clock information from incoming signals without use of a PLL, PI, closed CDR feedback loop, and the like. An embodiment provides these benefits based on a time integrator that recovers, using digital logic, data and clock information from incoming signals without use of a PLL, PI, CDR feedback loop, and the like. Other embodiments are described herein. The increased jitter tolerance has many applications, including mobile input/output (IO) standards (e.g., MIPI MPHY) where power consumption requirements are strict and signal integrity is affected by, for example, a nearby antenna.

Figure 2:
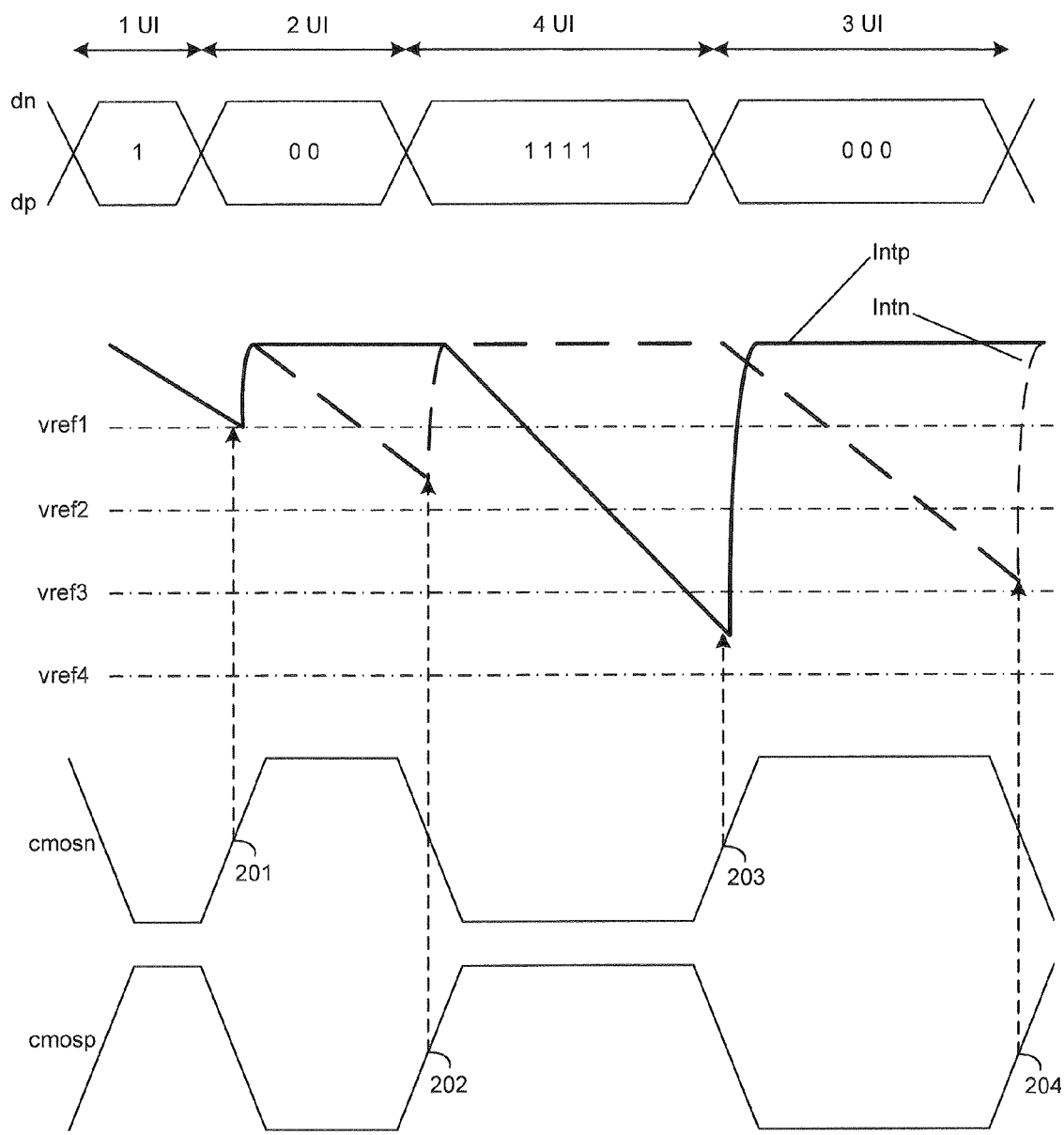
FIGS. 2-4 illustrate a voltage derivative Rx architecture in an embodiment of the invention.
Figures 3, 4:
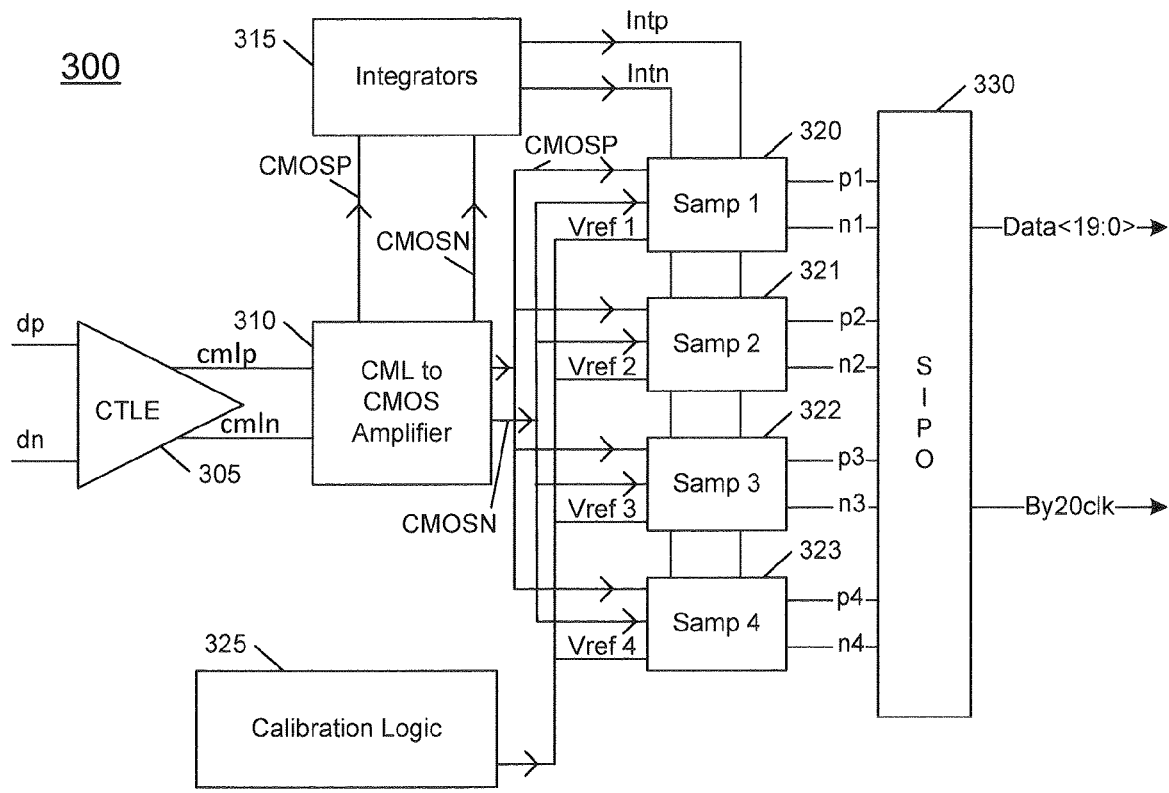

FIGS. 2-4 illustrate a voltage derivative Rx architecture in an embodiment of the invention. Rx 300 works in open loop mode where there is no CDR closed feedback loop. Furthermore, Rx 300 includes no PLL clock, clock-tree, or PI for eye tracking. Rx 300 uses inherent "edge density" of incoming data to generate/recover both clock and data information from incoming transmission signals dn, dp.

Edge density is associated with the assurance of edges provided by run length limited (RLL) coding. RLL coding is a line coding technique that bounds the length of stretches/runs of repeated bits during which the signal does not change. These bounds help avoid wander or DC offset issues. Rx 300 is operable with many encoding techniques including, but not limited to, RLL coding. One form of RLL coding used herein for discussion purposes is 8B/10B encoding but other encoding forms, such as 4B/5B, Manchester encoding, and the like, are also possible.

FIG. 2 illustrates operation of Rx 300 with 8B/10B encoding, which is bounded to have no more than 5 consecutive 1's or 0's. Rx 300 integrates the time interval of each bit length to generate an analog property. Rx 300 then compares this integrated value with a reference value to determine the bit length and thereby increase jitter tolerance. In FIG. 2 the solid line represents integrated value "Intp", the integrated value for data "dp". The dashed line represents integrated value "Intn", the integrated value for data "dn". dn and dp (at the top of FIG. 2) include a 1 UI portion (referred to herein as a "symbol") followed by a 2 UI symbol, a 4 UI symbol, and a 3 UI symbol. Rising edge 201 for cmosn (see also FIG. 3) corresponds to a peak integrated value that does not reach v ref 1, and thereby translates to a 1 UI bit length. (FIG. 4, discussed below, includes a table for translation of integrated values to bit lengths.) Rising edge 202 for cmosp (see also FIG. 3) corresponds to a peak integrated value that reaches v ref 1 but does not reach v ref 2, and thereby translates to a 2 UI bit length. Rising edge 203 corresponds to a peak integrated value that does not quite reach v ref 4, and thereby translates to a 4 UI bit length. Rising edge 204 corresponds to a peak integrated value that does not reach v ref 3, and thereby translates to a 3 UI bit length.

Incoming data dp, dn, once amplified to CMOS levels (see element 310 of FIG. 3), is used as a sampling clock (see cmosn and cmosp in FIGS. 2 and 3). This clock triggers (see rising edges 201, 202, 203, 204) integration of an analog property, which is compared with a fixed reference (see v ref 1, v ref 2, v ref 3, v ref 4). In one embodiment the analog property that is used for integration is voltage, but other embodiments use current, time, and the like. Considering FIG. 2 illustrates 8B/10B encoding, 4 reference voltages are needed to determine the bit length which ranges from 1 UI to 5 UI. However, encoding that allows shorter or longer RLL runs in other embodiments may correspondingly use less or more reference voltages.

With the above general discussion of a voltage integration embodiment in mind, focus is now on the operation of logic 300 in FIG. 3. In FIG. 3 continuous time linear equalizer (CTLE) 305 equalizes incoming data dp, dn to reduce ISI. Its output is delivered to CML-to-CMOS amplifier 310 to amplify the signals to full CMOS levels. These signals are named cmosn and cmosp in FIGS. 2-3 and are communicated to integrators 315 as well as to samplers 320, 321, 322, 323 to trigger sampling on rising edges 201, 202, 203, 204 of cmosn and cmosp. cmosn and cmosp are communicated to integrators 315 such that one of the signals is resetting the integrator while the other signal is used for integration (and vice versa). The subsequent edge of "next data" is used to compare the integrated voltage with the four reference voltages (v ref 1, v ref 2, v ref 3, v ref 4) to determine the bit length. In other words, edge 203 is subsequent to edge 202 and is used so that cmosn triggers a sample of intp. As another example, edge 204 is subsequent to edge 203 and is used so that cmosp triggers a sample of intn. This bit length recovery or discovery is done without need for a PLL, CDR loop, and the like.

FIG. 4 includes a table for bit length to integration value correspondence. For example, for the 4 UI portion of FIG. 2, samplers 320, 321, 322, 323 would produce p1/n1=1, p2/n2=1, p3/n3=1, and p4/n4=0 signals (see also FIG. 3 where that data is sent to serial-in/parallel-out shift register (SIPO) 330), which corresponds to a 4 UI bit length. Thus, depending on how many of sampler outputs p1/n1, p2/n2, p3/n3, and p4/n4 are high at each sampling edge (201, 202, 203, 204) Rx 300 can determine corresponding bit length for the UI at issue.

Samplers 320, 321, 322, 323 are calibrated by calibration logic 325. In an embodiment, the reference voltages (v ref 1, v ref 2, v ref 3, v ref 4) are pre-calibrated based on the frequency of incoming data. For example, pre-calibration may be accomplished using a training sequence. The training sequence may be, for example, an external sequence from a transmitter (Tx) driver or an internal sequence gathered via a Tx feedback loop. More specifically, a fixed data pattern may be sent and reference voltages (e.g., v ref 1, v ref 2, v ref 3, v ref 4) may be adjusted to match output data with input data. Once this calibration is done corresponding programming codes may be saved to memory. As a result, in one embodiment there is no need to perform a re-calibration every time the system is powered on. Thus, subsequent system startups are instantaneous (or at least accelerated) by avoiding the need for recalibration. This is possible because in one embodiment the calibration of a reference voltage (e.g., v ref 1, v ref 2, v ref 3, v ref 4) is a function of data frequency, which does not necessarily change a great deal. A change in phase for the signal is not a major factor for various embodiments including open loop system architectures. In contrast, with conventional closed CDR loops (see element 120 of FIG. 1), the phase of data must be tracked. Hence, training must occur every system reset as clocks need to be centered, which causes latency.

The jitter tolerance of Rx 300 is improved over Rx 100 and its power consumption is lower than Rx 100 considering Rx 300 includes no PI, CDR loop, and the like. Any new error terms generated from reference voltages (v ref 1, v ref 2, v ref 3, v ref 4) and samplers 320, 321, 322, 323 can be calibrated and accounted for. CDR loop latency is eliminated (because the CDR loop is removed), which means Rx 300 can more quickly adjust for jitter. Further, reference voltage calibration may be performed only one time (as explained above), which reduces startup latency (e.g., once voltage reference calibration is performed corresponding codes may be reused). Thus, with no CDR latency and reduced overall startup latency, Rx 300 has improved timing margins. In an embodiment Rx 300 depends on only a single individual UI (rather than many UIs as required with eye diagram architecture) for jitter management. In other words, Rx 300 determines UI bit length one UI at the time and thereby tolerates jitter on a UI by UI basis (instead of monitoring jitter over many UIs).

Also, low power, improved jitter tolerance, smaller die area (due to removal of PLL, PI, and other components mentioned above), and open loop operation (which lessens latency by avoiding CDR feedback loop) make Rx 300 suitable for mobile 10 applications such as MIPI MPHY based technology while being backward compatible with IO's that use, for example, 8B/10B encoding (e.g., PCIE, SATA, HDMI, and the like).

Figure 5:
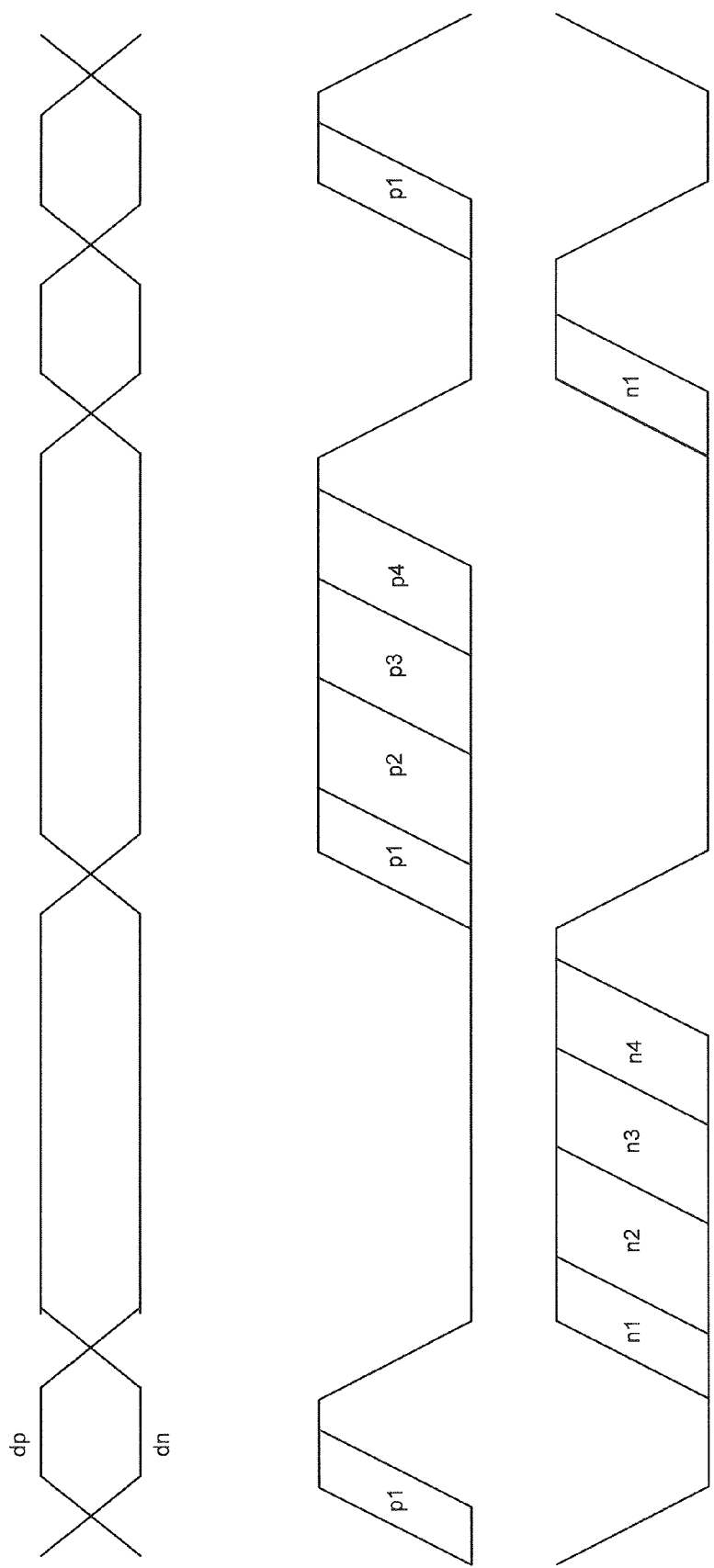
Figure 6:
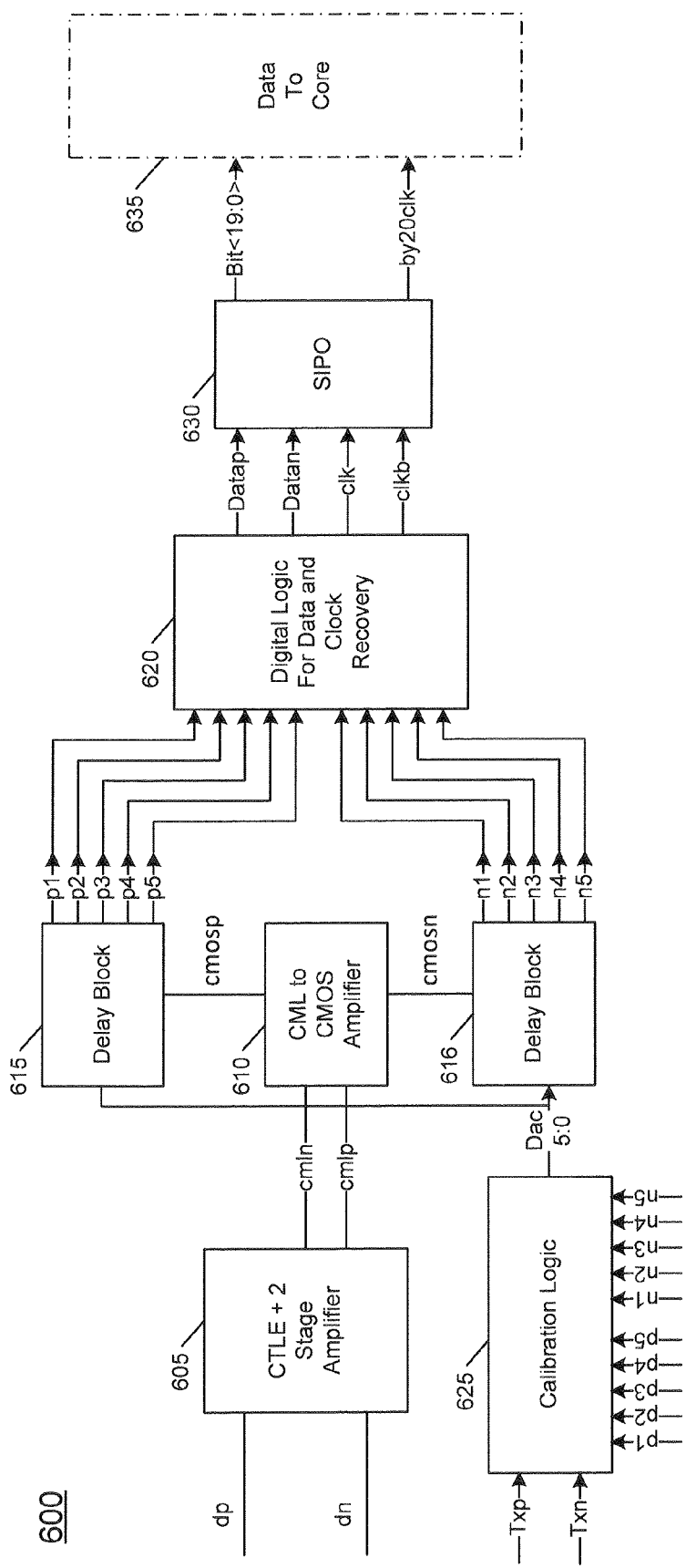

FIGS. 5-7 illustrate a time derivative Rx architecture in an embodiment of the invention.

Generally regarding FIG. 5, in on embodiment incoming data dp, dn (once amplified to CMOS levels) is used as a sampling clock. This clock triggers integration of an analog property such as, in one embodiment, time. A rising edge of dp or dn triggers a delay chain (discussed below) and the number of delay triggers for p1-p5 or n1-n5 depends on bit length. In other words, the integrated time value is compared with a reference value to determine bit length for a UI. In one embodiment, the delay between any of these triggers is exactly 1 UI as the delay chain is precalibrated to the data frequency (as explained above). In this case, an embodiment calibrates delays from p1-p5 and n1-n5 (instead of calibrating voltages). In one embodiment, the first trigger (p1 or n1) is one half a UI from a dp or dn edge. Five delay stages are needed to determine the bit length which ranges from 1 UI to 5 UI (due to 8B/10B run limits of 5 UI). Triggers on p1-p5 and n1-n5 are used to recover clock and data by using digital recovery logic. In other embodiments where runs are smaller or greater than 5, then fewer or more delay stages respectively may be needed.

In FIG. 6 CTLE 605 equalizes incoming data dp, dn. CTLE output is then amplified to full CMOS levels via CML-to-CMOS amplifier 610. The outputs of amplifier 610 triggers delay chains in delay blocks 615, 616 such that one of them is reset while the other one counts or integrates the number of UI. Depending on how many of the integrated delay chain outputs are high at each sampling edge Rx 600 can determine the preceding bit length. For example, in FIG. 7 when integrated time value is such that p1/n1=1 and p2/n2=2, then a 2 UI bit length is present. For FIG. 6, a total of 10 outputs (p1-p5 and n1-n5) are generated from the two delay chain blocks 615, 616. Delays blocks 615, 616 produce output from which clock and data information can be recovered (block 630) and then sent to core 635.

The jitter tolerance of Rx 600 is improved over that of the circuit of FIG. 1 and its power consumption is lower considering Rx 600 includes no PI, CDR loop (Rx 600 is an open loop architecture), and the like. CDR latency is eliminated (because the CDR loop is removed), so Rx 600 can more quickly adjust for jitter. Further, delay calibration is only needed once, which means startup latency is reduced. Thus, with no CDR latency and reduced startup latency, Rx 600 has improved timing margins. In an embodiment Rx 600 depends on only a single individual UI (rather than many UIs as required with eye diagram architecture). Low power, improved jitter tolerance, smaller die area (due to removal of PLL, PI, and other components mentioned above), and open loop operation (which lessens latency by avoiding CDR feedback loop) make Rx 600 suitable for mobile IO applications such as MIPI MPHY while being backward compatible with IO's that use 8B/10B encoding (e.g., PCIE, SATA, HDMI, and the like). In addition, integration of time instead of, for example, voltage means the entire Rx runs in digital mode (which gives desirable signal-noise-ratio (SNR)), does not use analog samplers, removes associated analog offsets, and promotes full rate clock recovery as an embodiment has an edge trigger on p1-p5 or n1-n5 for every UI.

Figure 8:
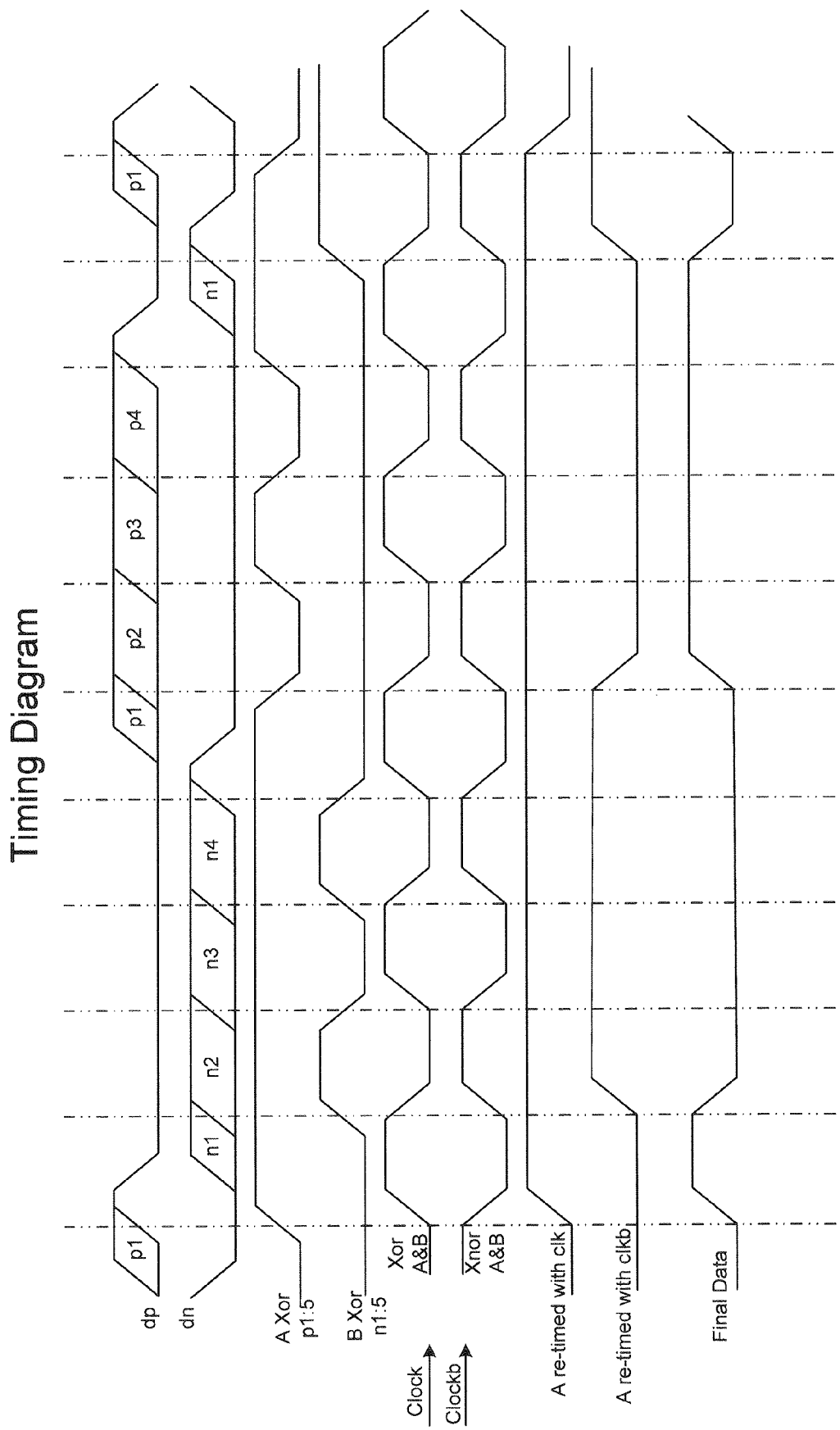
FIG. 8 illustrates a timing diagram for an embodiment of the invention.

With a general overview of FIGS. 5-7 addressed above, a more detailed look at embodiments for time integration based architecture is now addressed. FIG. 8 illustrates a timing diagram for an embodiment of the invention including Rx 600. dp and dn are at the top of FIG. 8. Signal "A" is an XOR of dp (p1-p5) and Signal "B" is an XOR of dn (n1-n5). Clock data is recovered from Tx data and as indicated by the signal "clock", which is determined based on an XOR of signals "A" and "B". "clockb" is determined based on an XNOR of signals A and B. Sampling occurs with signal A re-timed with the "clock" signal to generate the signal "A re-timed with clk". Sampling also occurs with signal A retimed with the "clockb" signal to generate the signal "A re-timed with clkb". Then the actual data signal is recovered as "final data" based on an XOR of "A re-timed with clk" and "A re-timed with clkb". Thus, FIG. 8 shows how both the clock and data signals are recovered from Tx input data dp, dn without using a PLL, a closed CDR loop, clock tree, PI, and the like.

Figure 9:
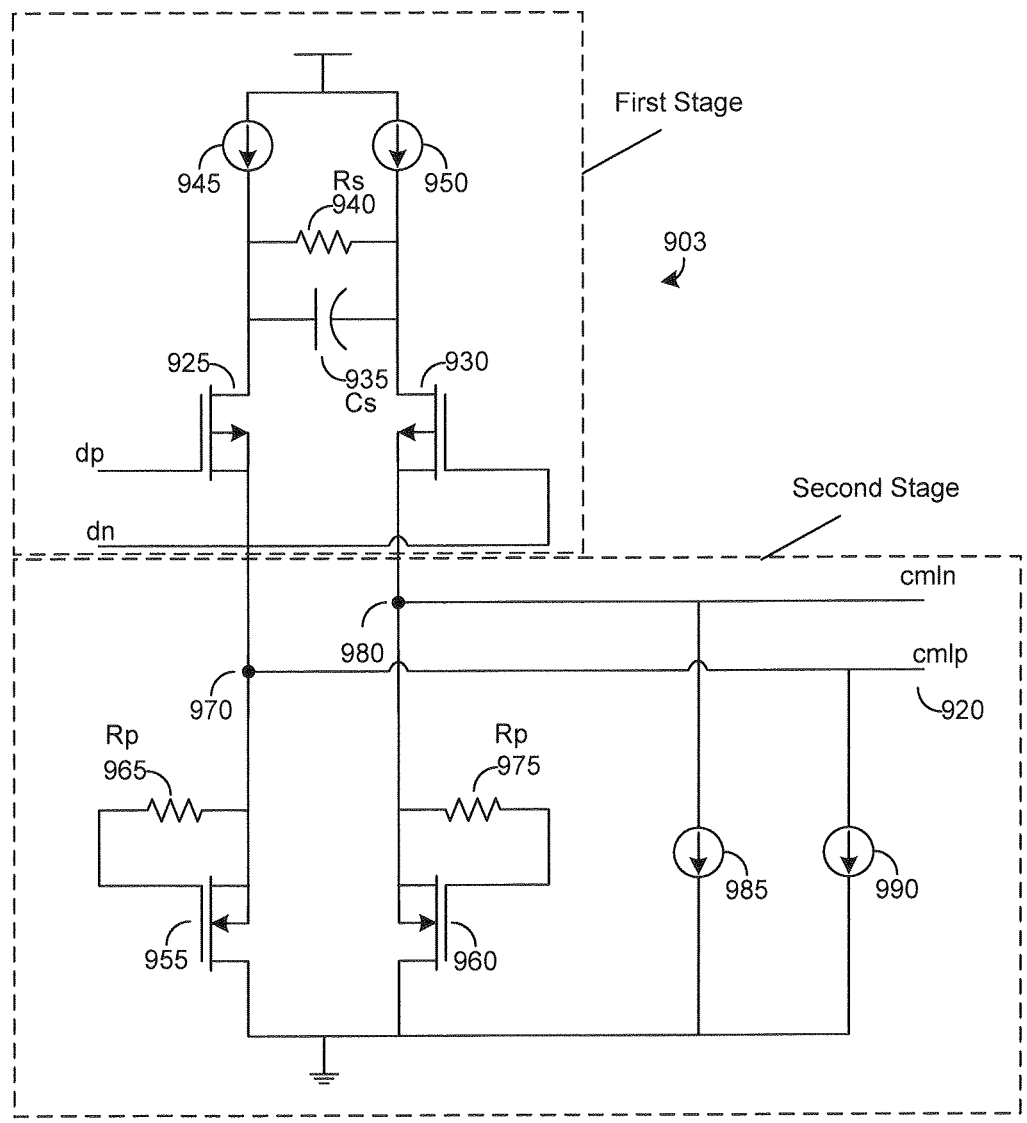
FIG. 9 illustrates equalization logic for an embodiment of the invention.

FIG. 9 illustrates equalization logic for an embodiment of the invention. For example, CTLE 605 (FIG. 6) or CTLE 305 (FIG. 3) may include CTLE 903 (FIG. 9). Embodiments may use various equalization circuits such as, for example, those found in United States Patent Application Number 2008/0101450 (assigned to Intel Corporation). Logic 903 includes a second order CTLE circuit. Parallel resistor 940 (sometimes referred herein as "Rs") and capacitor 935 (sometimes referred herein as "Cs") are included in a first stage. The second stage of CTLE circuit 903 includes resistors 965, 975 (sometimes referred herein as "Rp" based on 965 and/or 975) in the PMOS load (connected to the amplifier output). Equalization is provided by selecting the value of components Rs, Cs, and/or Rp appropriately (e.g., by using resistance compensation (RCOMP) codes to select the values).

A more detailed discussion of CTLE circuit 903 is now provided. Circuit 903 includes the first stage receiving a differential input signal (dp, dn), and outputting a differential output signal (cmlp, cmln). Portion dp of the differential input signal is received at a gate of PMOS transistor 925. Portion dn of the differential input signal is received by a gate of PMOS transistor 930. A first node of capacitive element 935 is coupled to a drain of transistor 925 and a second node of capacitive element 935 is coupled to a drain of transistor 930. Capacitive element 935 may comprise any capacitive element or elements that are or become known.

A first node of resistive element 940 is coupled to the drain of transistor 925 and a second node of resistive element 940 is coupled to the drain of transistor 930. A first node of current source 945 is coupled to a supply voltage and a second node of current source 945 is coupled to the first node of resistive element 940. Similarly, a first node of current source 950 is coupled to the supply voltage and a second node of current source 950 is coupled to the second node of resistive element 940.

Circuit 903 also includes n-type metal-oxide semiconductor (NMOS) transistor 955 and NMOS transistor 960, drains of which are coupled to ground. Resistive element 965 includes a first node and a second node, with the first node of resistive element 965 being coupled to a gate of transistor 955 and the second node of resistive element 965 being coupled to a source of transistor 955. The second node is also coupled to output node 970 of the first stage, which outputs portion cmlp of the output differential signal.

Resistive element 975 also includes a first node and a second node. The first node of resistive element 975 is coupled to a gate of transistor 960 and the second node of resistive element 975 is coupled to a source of transistor 960 and to output node 980 of the first stage. Output node 980 is to output portion cmln of the output differential signal.

Circuit 903 also includes current source 985 and current source 990. A first node of current source 985 is coupled to output node 980 and a second node of current source 985 is coupled to ground. A first node of current source 990 is coupled to output node 970 and a second node of current source 990 is coupled to ground. Current sources 985 and 990 may be controlled to control an operating point of circuit 903 and/or to provide offset correction. Some embodiments of circuit 903 do not include current sources 985 and 990.

The transfer function of circuit 903 may be equal to:

$$\frac{g_{m1}}{g_{m2}\left(1+g_{m1}\frac{R_s}{2}\right)} \frac{(1+sR_sC_s)(1+sR_pC_g)}{\left(1+s\frac{R_sC_s}{\left(1+g_{m1}\frac{R_s}{2}\right)}\right)\left(1+s\frac{C_g+C_L}{g_{m2}}+s^2\frac{R_pC_gC_L}{g_{m2}}\right)},$$

where Rs is a resistance of resistive element 940, Rp is a resistance of resistive elements 965 and 975, $g_{m1}$ is a transconductance of the differential transistor pair 925/930, $g_{m2}$ is a transconductance of transistors 955 and 960, Cg is a total capacitance at the gate of transistors 955 and 960, and CL is a total capacitance at output nodes 970 and 980. CL may take into account loads of any circuits attached thereto.

At least one of resistive elements 940, 965 and 975 may comprise a variable resistive element including but not limited to an active transistor circuit. The poles and zeroes of the above transfer function may be controlled by appropriate selection of the various components of circuit 903, and may also be controlled during operation by varying resistances of the resistive elements. Furthermore, capacitive element 935 may comprise a variable capacitive element. FIG. 9 is just one example of a CTLE circuit and many other such circuits may be used in other embodiments.

Figure 10:
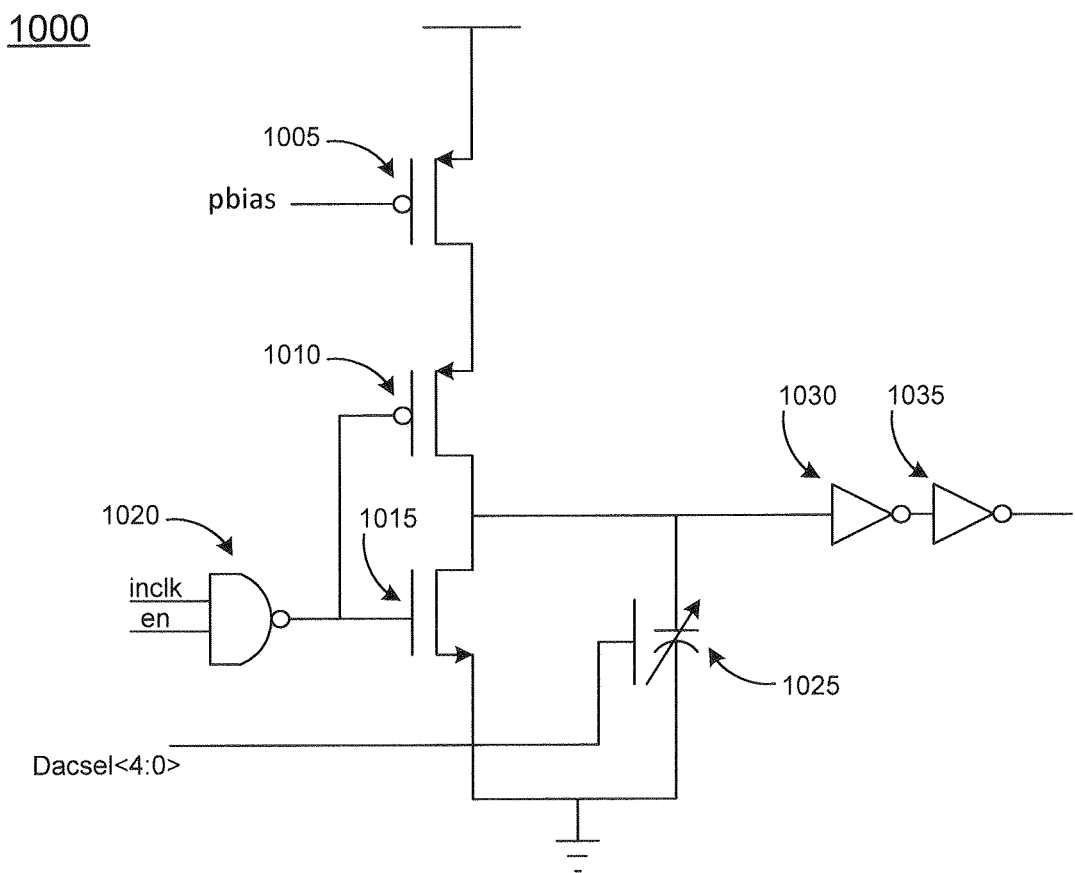
FIGS. 10-12 illustrate delay logic in an embodiment of the invention.
Figure 11:
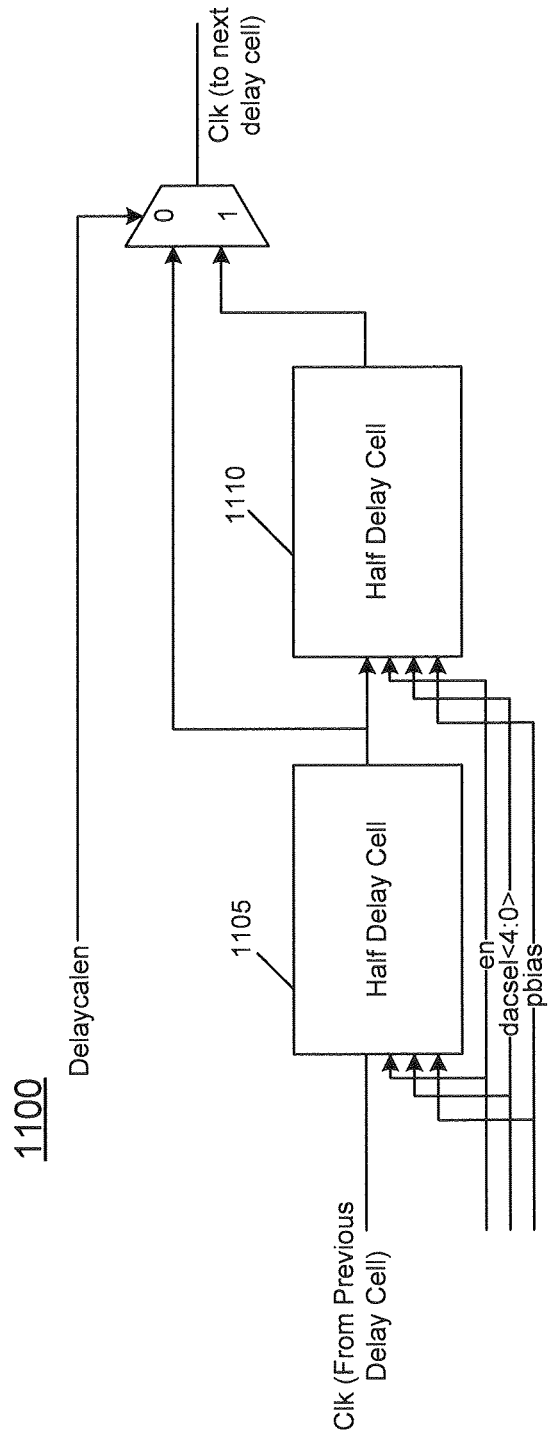
Figure 12:
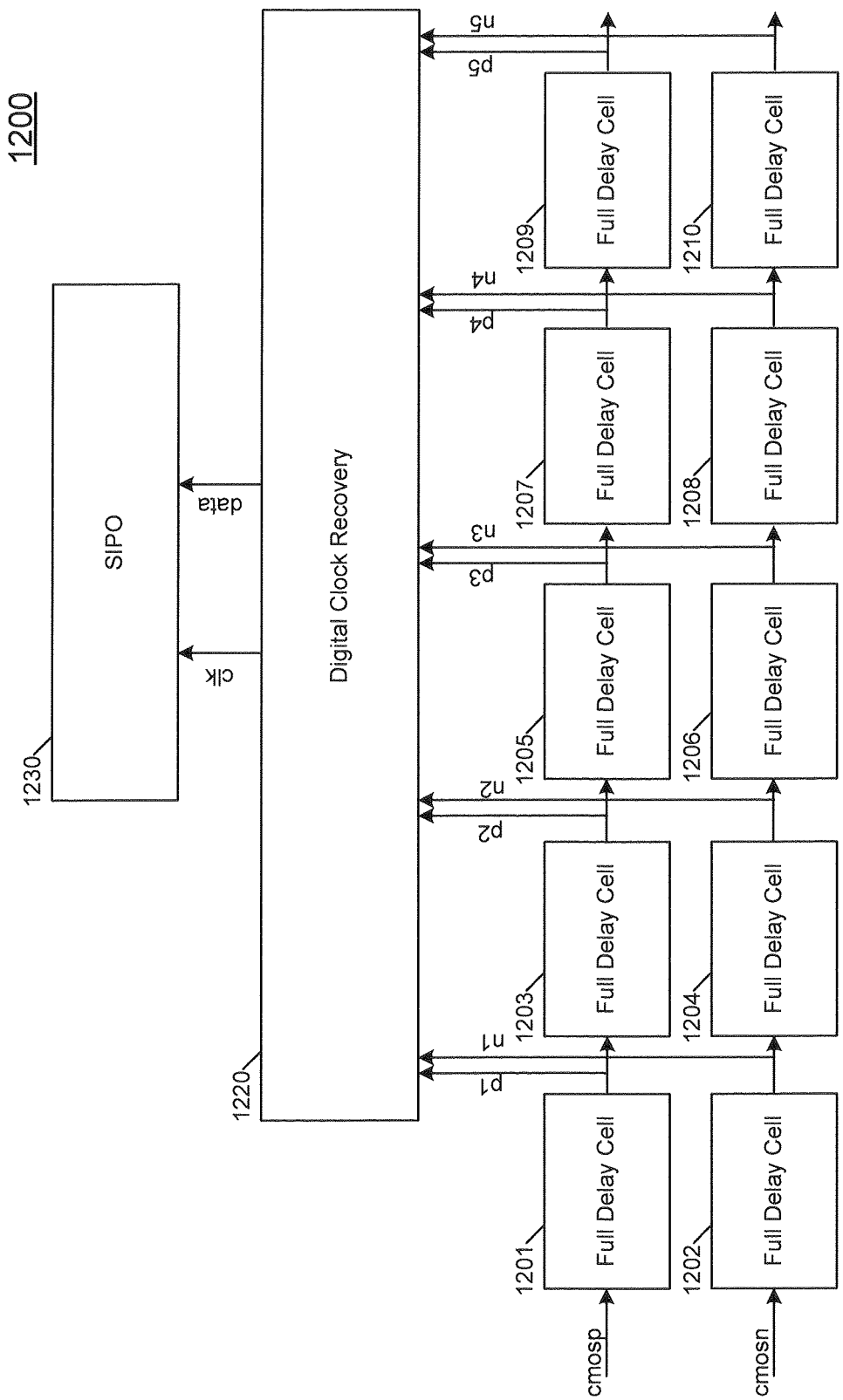

FIGS. 10-12 illustrate delay logic in an embodiment of the invention. For example, the half delay cell (FIG. 10) and the full delay cell (FIG. 11) may be used in delay chains/blocks 615, 616 (FIG. 6). The half delay cell 1000 (FIG. 10) may operate to produce the half UI p1 of FIG. 8 and the full delay cell 1100 (FIG. 11) may operate to produce the full UI p2, p3, p4, p5 of FIG. 8. Making p1 (or another portion) less than a full UI with the remaining p2-p5 each equal to 1 UI means collectively p1-p5 will amount to a maximum 4.5 UI, thereby allowing for jitter while still fitting the 4.5 UI maximum plus jitter within the 5 UI run limit of 8B/10B encoding. These values may change whereby additional values may be assigned to less than 1 UI lengths if, for example, there is an increased amount of jitter.

Regarding FIG. 10, half delay cell 1000 uses variable capacitive element 1025 that is charged from vss to vcc and inverter chain 1030, 1035 to provide delay for symbol bit tracking. When enabled (using, for example, logic 1005, 1010, 1015) a constant current changes variable capacitive element 1025 to vcc and when disabled variable capacitive element 1025 is discharged to vss. By adjusting variable capacitive element 1025 and/or current (pbias) to switching element 1005 logic 1000 can be adjusted for different gears. "Gears" are different modes of speed and are further described in MIPI standards and are similar to modes found in standards for PCIE generations 1, 2, and 3.

Regarding FIG. 11, with logic 1100 each half delay cell 1105, 1110 (see FIG. 10 for an example of a half delay cell) is muxed with "cal enable" (a calibration enable signal abbreviated as "delaycalen") at mux 1115. During calibration mode delaycalen is logic 1 and is calibrated with a Tx pattern for an ideal UI (see calibration logic 625). Then in functional mode delaycalen for the first full delay cell is logic 0. This shifts all the clocks by half a UI and centers the data signal with the clock signal.

FIG. 12 includes logic 1200 that illustrates how delay blocks 615, 616 interface digital clock recovery 620. The delay cells for cmosp are sequentially aligned to provide delay thresholds that translate to bit lengths (see FIG. 7). In other words, cmosp is communicated through and integrated via delay line 1201, 1203, 1205, 1207, 1209 and cmosn is communicated through and integrated via delay line 1202, 1204, 1206, 1208, 1210. These values are communicated to digital clock recovery 1220, which then communicates to SIPO 1230. In one embodiment, each full delay cell is made of two half cells in series with one another and with a control bit that can set the cell to a half delay or a full delay. During calibration all the delay cells are set to one full UI delay and once calibration is done the first delay cell is set to a half delay. This shifts p1-p5 and n1-n5 by a half UI.

Figure 13:
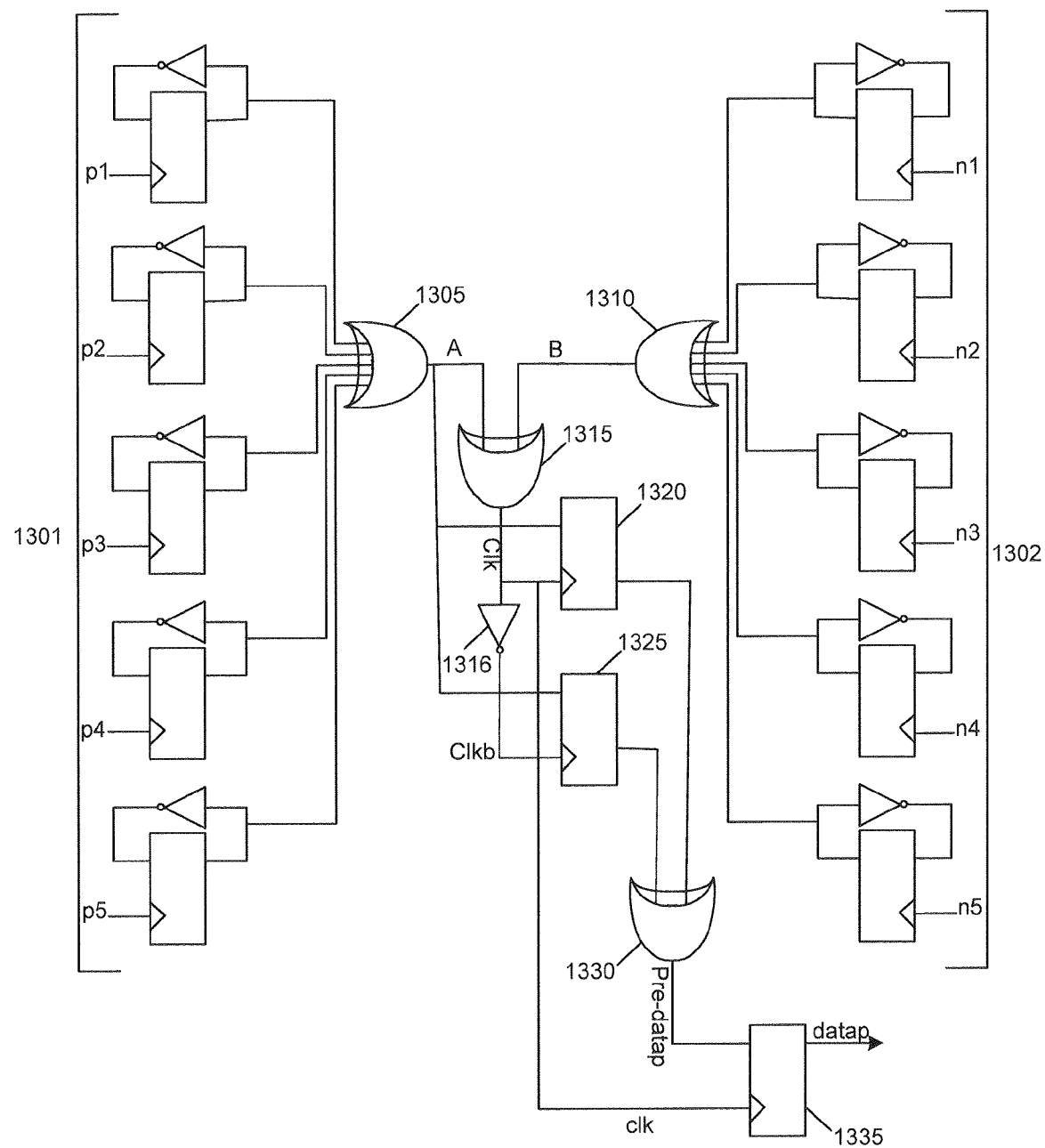
FIG. 13 includes clock and data recovery logic in an embodiment of the invention.

FIG. 13 provides digital logic for an embodiment of digital clock recovery logic 1220 (or logic 620 in FIG. 6). Logic 1300 allows delay from any trigger on p1-p5 and n1-n5 to the next subsequent trigger to be exactly 1 UI. Also, logic 1300 counts the number of 1's/0's in bit length via the XOR logic described below. Edges on p1-p5 and n1-n5 are stored using a flip flop with inverter feedback from the flip flop output to the flip flop data input (a "div2" flop). An XOR of all the stored states will generate the recovered clock, from which the Tx data can be recovered (as explained above with regard to FIG. 8).

FIG. 13 relates to FIG. 8 as follows. An XOR of P1-P5 (stored in flip flops 1301) generates signal "A" and an XOR of N1-N5 (stored in flops 1302) generates signal "B". The clock signal "clk" in FIG. 13 ("clock" in FIG. 8) is the XOR (1315) of signals A and B and the clock signal "clkb" in FIG. 13 ("clockb" in FIG. 8) is the XNOR (inverter 1316) of signals A and B. Sampler 1320 yields the signal "A retimed with clk" (FIG. 8) and sampler 1325 yields the signal "A retimed with clkb" (FIG. 8). The XOR (1330) of "A retimed with clk" and "A retimed with clkb" yields recovered data signal "datap" ("final data" in FIG. 8) and recovered clock signal "clk" ("clock" in FIG. 8). Thus, for FIG. 13 full rate clock and data information are recovered from 10 inputs (p1-p5 and n1-n5). This is done using relatively very few gates. The final data and clock signals are sent to SIPO 630 to deliver 20 bit parallel data and "by20" clock to core 635. For example, serial high speed data goes through SIPO 630. SIPO 630 converts clock/data to a by20 or by10 rate clock and 20 or 10 bit parallel data that is used by a core. In an embodiment, the core runs at a lower frequency compared to IO signals.

Rx 600 is a compact Rx that reduces power while providing high jitter tolerance. For example, various embodiments described herein (e.g., Rx 600) may track frequency at rates such as 20% of the data rate. Thus, for a 5 Gbps signal such an embodiment can process jitter bandwidth of 1 GHz or more. Other embodiments may process higher or lower percentages of data rate signals such as 15%, 25%, 30%, and the like.

Figure 14:
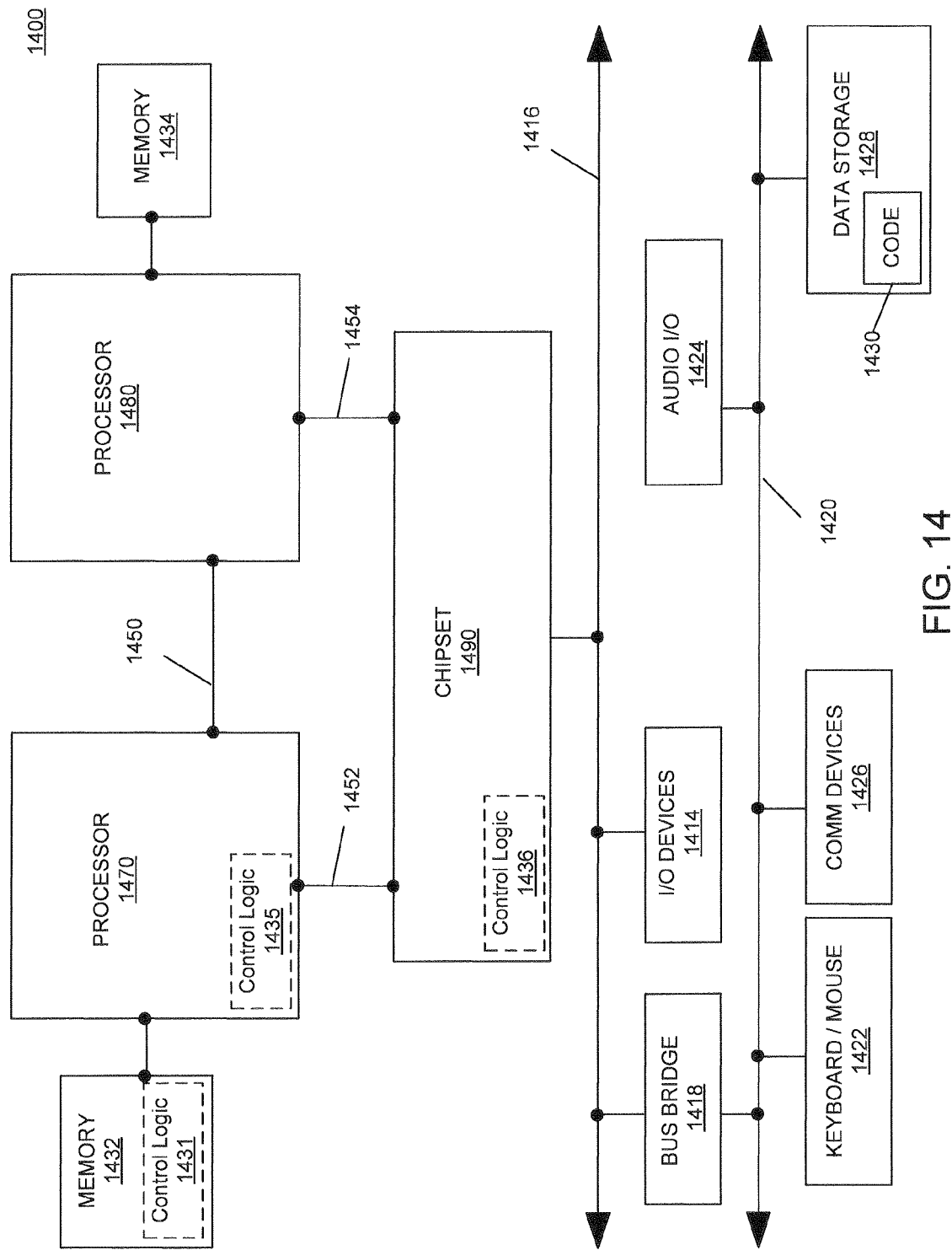
FIG. 14 includes a system for use with embodiments of the invention

Embodiments may be implemented in many different system types. Referring now to FIG. 14, shown is a block diagram of a system in accordance with an embodiment of the present invention. System 1400 may be found in a desktop, laptop, notebook, cell phone, Ultrabook, Smartphone, mobile computing node, and the like. Multiprocessor system 1400 is a point-to-point interconnect system, and includes a first processor 1470 and a second processor 1480 coupled via a point-to-point interconnect 1450. Each of processors 1470 and 1480 may be multicore processors. The term "processor" may refer to any device or portion of a device that processes electronic data from registers and/or memory to transform that electronic data into other electronic data that may be stored in registers and/or memory. First processor 1470 may include a memory controller hub (MCH) and point-to-point (P-P) interfaces. Similarly, second processor 1480 may include a MCH and P-P interfaces. The MCHs may couple the processors to respective memories, namely memory 1432 and memory 1434, which may be portions of main memory (e.g., a dynamic random access memory (DRAM)) locally attached to the respective processors. First processor 1470 and second processor 1480 may be coupled to a chipset 1490 via P-P interconnects, respectively. Chipset 1490 may include P-P interfaces. Furthermore, chipset 1490 may be coupled to a first bus 1416 via an interface. Various input/output (I/O) devices 1414 may be coupled to first bus 1416, along with a bus bridge 1418, which couples first bus 1416 to a second bus 1420. Various devices may be coupled to second bus 1420 including, for example, a keyboard/mouse 1422, communication devices 1426, and data storage unit 1428 such as a disk drive or other mass storage device, which may include code 1430, in one embodiment. Code may be included in one or more memories including memory 1428, 1432, 1434, memory coupled to system 1400 via a network, and the like. Further, an audio I/O 1424 may be coupled to second bus 1420.

Embodiments may be implemented in code and may be stored on storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (1435). However, in another embodiment, logic also includes software or code (1431). Such logic may be integrated with hardware, such as firmware or micro-code (1436). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

Figure 15:
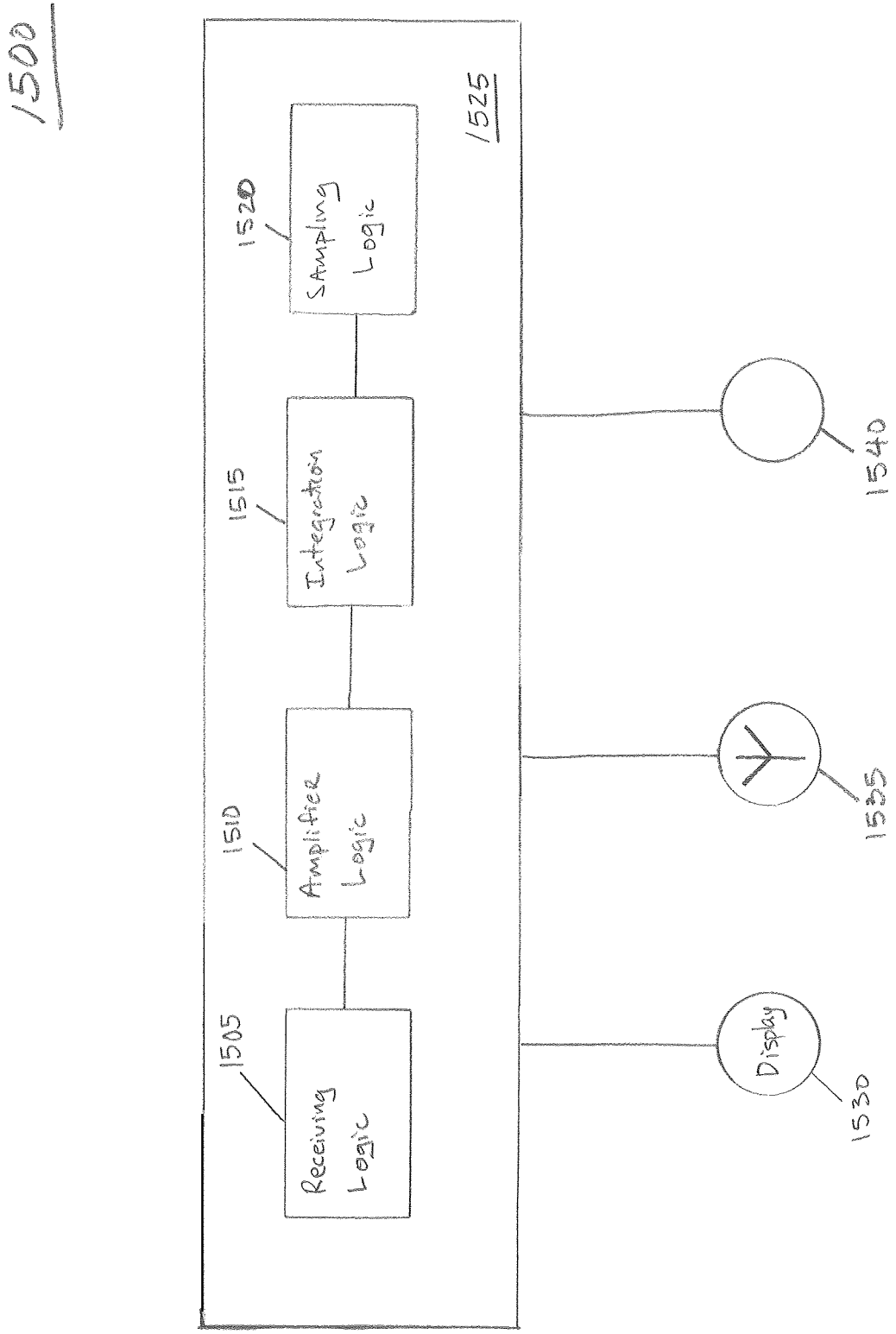
FIG. 15 includes a system in an embodiment of the invention.

FIG. 15 includes an embodiment of the invention where receiving logic 1505 receives a differential signal including symbols. Amplifier logic 1510 (e.g., element 310, 610) amplifies the differential signal to obtain an amplified differential signal. Integration logic 1515 (e.g., element 315, 615, 616) integrates the amplified differential signal to obtain an integrated representation of the differential signal. Sampling logic 1520 (e.g., elements 320, 321, 322, 323) causes a sample of the integrated representation of the differential signal based on the amplified differential signal. Receiving logic 1505, amplifier logic 1510, integration logic 1515, and sampling logic 1520 are included in a system on chip (SOC) integrated circuit 1525 within user endpoint device 1500. SOC 1520 is coupled to radio and antenna 1535, and controller 1540 to receive input from a touch enabled display 1530 of the user endpoint device. System 1500 may include laptop computers, cellular phones, personal digital assistants, wireless local area network interfaces, Smartphones, Ultrabooks, mobile communications device, mobile computing node, and the like.

One embodiment includes a receiver comprising first and second signals (e.g., dp, dn) that are received directly from (or derived from) a transmission from a transmitter. Receiver logic, such as the many components in logic 300 and 600, determine both a clock signal and a data signal from, for example, dp and/or dn without help from a PLL. While there may be a PLL somewhere in the receiver or coupled to the receiver, the PLL is not used to determine the clock (e.g., "clock" of FIG. 8) and data (e.g., "Final data" of FIG. 8) signals in one embodiment of the invention. The same is true for closed feedback loops, which may be found somewhere in the receiver but do not help determine the clock or data signals. The receiver determines a bit length of a symbol (see, e.g., FIGS. 4 and 7) included in the second signal based on the clock signal from the first signal. For example, in FIG. 2 cmosn is used to determine a symbol length for intp/dp. Further, "clock" and "clockb" are both based on dp and dn and are both used to determine "Final data".

In one embodiment the receiver derives a signal from another signal (e.g., cmlp is derived from dp, cmosp is derived from cmlp, "A" of FIG. 8 is derived from dp). The receiver determines a concatenation (e.g., XOR, XNOR, AND, NOR, and the like) of two or more derived signals (e.g., "clock" in FIG. 8 is a concatenation of "A" and "B").

In an embodiment signals (e.g., dp and dn) are RLL encoded at an upper limit (n) of consecutive like bit values. For example, with 8B/10B n=5. In an embodiment the receiver compares integrated values to n reference signals to determine a bit length of a symbol. In an embodiment, the n reference signals are not all equally spaced from one another. For example, p1 is not the same size as p2 in FIG. 5. This allows for jitter and for all the appropriate UIs to be included within the RLL bound (5 for 8B/10B).

An embodiment includes a receiver comprising: at least one memory to receive first and second signals in response to a transmission from a transmitter, the first and second signals being run length limited (RLL) encoded; and receiver logic, coupled to the at least one memory, to determine both a clock signal and a data signal from the first signal independently of timing information from phase locked loop (PLL) logic. In an embodiment the receiver logic is to determine a bit length of a symbol included in the second signal based on the clock signal from the first signal. In an embodiment the receiver logic includes no PLL logic. In an embodiment the receiver logic is to determine the clock and data signals from the first signal independently of a closed feedback loop. In an embodiment the first signal is a polar opposite of the second signal. In an embodiment the receiver logic is to: derive a first derived signal from the first signal and a second derived signal from the second signal; determine a concatenation of the first and second derived signals; and determine the clock and data signals based on the concatenation. In an embodiment the concatenation is based on one of an XOR and an XNOR logical operation. In an embodiment the receiver logic is to: derive a first derived signal from the first signal and a second derived signal from the second signal; integrate the first derived signal to determine a first integrated signal; sample the first integrated signal, based on timing from the second derived signal, to determine a first sample; compare the first sample to a reference signal to determine a first comparison; and determine a bit length of a symbol included in one of the first and second signals based on the first comparison. In an embodiment the receiver logic is to integrate one of voltage and time of the first derived signal to determine the first integrated signal. In an embodiment the first and second signals are RLL encoded at an upper limit (n) of consecutive like bit values, and the receiver logic is to: derive a first derived signal from the first signal and a second derived signal from the second signal; integrate the first derived signal to determine a first integrated signal; sample the first integrated signal, based on timing from the second derived signal, to determine a first sample; compare the first sample to n reference signals to determine a first comparison; and determine a bit length of a symbol included in one of the first and second signals based on the first comparison. In an embodiment the n reference signals are not all equally spaced from one another. In an embodiment the transmission includes jitter; and the receiver logic is to recover the clock and data signals from the transmission. In an embodiment the receiver logic is to determine a bit length of a symbol included in the second signal on a symbol-by-symbol basis. In an embodiment the receiver logic is to determine a bit length of a symbol included in the second signal independently of any other symbol included in the transmission. In an embodiment the receiver logic is to determine a bit length of a symbol included in one of the first and second signals independently of eye tracking. In an embodiment the receiver logic is to: derive a first derived signal from the first signal and a second derived signal from the second signal; integrate the first derived signal via a first integrator and the second signal via a second integrator; and reset the first integrator in parallel with integrating with the second integrator.

An embodiment includes a receiver comprising: equalization logic; amplifier logic, coupled to the equalization logic, to amplify first and second signals in response to a transmission from a transmitter, the first and second signals being run length limited (RLL) encoded; and receiver logic, coupled to the amplifier logic, to determine both a clock signal and a data signal from the first signal independently of timing information from phase locked loop (PLL) logic. In an embodiment the receiver logic includes: a first plurality of flip flops for the first signal and a second plurality of flip flops for the second signal; a first logic gate to determine a first derivative signal from the first signal and a second logic gate to determine a second derivative signal from the second signal; and a third logic gate to concatenate the first and second derivative signals to determine the clock signal. In an embodiment the receiver logic includes a first delay chain that is to delay a symbol included in the first chain in proportion to a total bit length of the symbol. In an embodiment the receiver includes first and second integrators to respectively integrate a first derived signal, derived from the first signal, and a second derived signal, derived from the second signal; wherein the first integrator is to reset in parallel with the second integrator integrating.

An embodiment includes receiving logic configured to receive a differential signal to represent a plurality of symbols; amplifier logic coupled to the receiving logic, the amplifier logic to amplify the differential signal to obtain an amplified differential signal; integration logic coupled to the amplifier logic, the integration logic to integrate the amplified differential signal to obtain an integrated representation of the differential signal; and sampling logic coupled to the amplifier logic and the integration logic, the sampling logic to cause a sample of the integrated representation of the differential signal based on the amplified differential signal. In an embodiment the sample of the integrated representation of the differential signal includes a comparison of the integrated representation of the differential signal to at least one threshold value to determine a symbol length of the plurality of symbols. In an embodiment the receiving logic, amplifier logic, integration logic, and sampling logic are included in a system on chip (SOC) integrated circuit within a user endpoint device, the SOC coupled to a radio and a controller to receive input from a touch enabled display of the user endpoint device.

An embodiment includes a method comprising: receiving a differential signal to represent a plurality of symbols; amplifying the differential signal to obtain an amplified differential signal; integrating the amplified differential signal to obtain an integrated representation of the differential signal; and sampling the integrated representation of the differential signal based on the amplified differential signal. The method may include determining a comparison of the integrated representation of the differential signal to at least one threshold value in response to the sampling; and determining a symbol length of a symbol included in the plurality of symbols based on the comparison. In an embodiment the method includes receiving the differential signal via receiving logic, amplifying the differential signal via amplifier logic, integrating the amplified differential signal via integration logic, and sampling the integrated representation of the differential signal via sampling logic; wherein the receiving logic, amplifier logic, integration logic, and sampling logic are included in a system on chip (SOC) integrated circuit within a user endpoint device, the SOC coupled to a radio and a controller to receive input from a touch enabled display of the user endpoint device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A receiver comprising:
   at least one memory configured to receive first and second signals at a single instant in time in response to a transmission from a transmitter, the first and second signals being run length limited (RLL) encoded; and
   receiver logic, coupled to the at least one memory, to determine both a clock signal and a data signal from the first signal independently of timing information from phase locked loop (PLL) logic;
   wherein the receiver logic is to determine a bit length of a symbol included in the second signal based on the clock signal from the first signal.

2. The receiver of claim 1, wherein the receiver logic includes no PLL logic.

3. The receiver of claim 1, wherein the receiver logic is to determine the clock and data signals from the first signal independently of a closed feedback loop.

4. The receiver of claim 1, wherein the first signal is a polar opposite of the second signal.

5. The receiver of claim 1, wherein the receiver logic is to:
   derive a first derived signal from the first signal and a second derived signal from the second signal;
   determine a concatenation of the first and second derived signals; and
   determine the clock and data signals based on the concatenation.

6. The receiver of claim 5, wherein the concatenation is based on one of an XOR and an XNOR logical operation.

7. The receiver of claim 1, wherein the receiver logic is to:
   derive a first derived signal from the first signal and a second derived signal from the second signal;

integrate the first derived signal to determine a first integrated signal;
sample the first integrated signal to determine a first sample;
compare the first sample to a reference signal to determine a first comparison; and
determine at least one of the bit length of the symbol and an additional bit length of an additional symbol included in one of the first and second signals based on the first comparison.

8. The receiver of claim 7, wherein the receiver logic is to integrate one of voltage and time of the first derived signal to determine the first integrated signal.

9. The receiver of claim 1, wherein the first and second signals are RLL encoded at an upper limit N of consecutive like bit values, and the receiver logic is to:
derive a first derived signal from the first signal and a second derived signal from the second signal;
integrate the first derived signal to determine a first integrated signal;
sample the first integrated signal to determine a first sample;
compare the first sample to N reference signals to determine a first comparison; and
determine at least one of the bit length of the symbol and an additional bit length of an additional symbol included in one of the first and second signals based on the first comparison;
wherein N is greater than 1.

10. The receiver of claim 9, wherein the N reference signals are not all equally spaced from one another.

11. The receiver of claim 1 wherein the transmission includes jitter.

12. The receiver of claim 1, wherein the receiver logic is to determine at least one of the bit length of the symbol and an additional bit length of an additional symbol included in the second signal on a symbol-by-symbol basis.

13. The receiver of claim 1, wherein the receiver logic is to determine at least one of the bit length of the symbol and an additional bit length of an additional symbol included in the second signal independently of any other symbol included in the transmission.

14. The receiver of claim 1, wherein the receiver logic is to determine at least one of the bit length of the symbol and an additional bit length of an additional symbol included in one of the first and second signals independently of eye tracking.

15. The receiver of claim 1, wherein the receiver logic is to:
derive a first derived signal from the first signal and a second derived signal from the second signal;
integrate the first derived signal via a first integrator and the second signal via a second integrator; and
reset the first integrator in parallel with integrating with the second integrator.

16. A receiver comprising:
equalization logic;
amplifier logic, coupled to the equalization logic, to amplify first and second signals, which are both to be stored in the receiver at a single instant in time, in response to a transmission from a transmitter, the first and second signals being run length limited (RLL) encoded;
receiver logic, coupled to the amplifier logic, to determine both a clock signal and a data signal from the first signal independently of timing information from phase locked loop (PLL) logic; and
first and second integrators, included in the receiver logic to respectively integrate a first derived signal, derived from the first signal, and a second derived signal, derived from the second signal;
wherein the first integrator is to reset in parallel with the second integrator integrating.

17. The receiver of claim 16, wherein the receiver logic includes:
a first plurality of flip flops for the first signal and a second plurality of flip flops for the second signal;
a first logic gate to determine the first derivative signal from the first signal and a second logic gate to determine the second derivative signal from the second signal; and
a third logic gate to concatenate the first and second derivative signals to determine the clock signal.

18. The receiver of claim 16, wherein the receiver logic includes a first delay chain that is to delay a symbol included in the first chain in proportion to a total bit length of the symbol.

19. An apparatus comprising:
receiving logic configured to receive a differential signal to represent a plurality of symbols;
amplifier logic coupled to the receiving logic, the amplifier logic to amplify the differential signal to obtain an amplified differential signal;
integration logic coupled to the amplifier logic, the integration logic to integrate the amplified differential signal to obtain an integrated representation of the differential signal; and
sampling logic coupled to the amplifier logic and the integration logic, the sampling logic to cause a sample of the integrated representation of the differential signal based on the amplified differential signal.

20. The apparatus of claim 19, wherein the sample of the integrated representation of the differential signal includes a comparison of the integrated representation of the differential signal to at least one threshold value to determine a symbol length of the plurality of symbols.

21. The apparatus of claim 19, wherein the receiving logic, amplifier logic, integration logic, and sampling logic are included in a system on chip (SOC) integrated circuit within a user endpoint device, the SOC coupled to a radio and antenna and a controller to receive input from a touch enabled display of the user endpoint device.

22. A method comprising:
receiving a differential signal to represent a plurality of symbols;
amplifying the differential signal to obtain an amplified differential signal;
integrating the amplified differential signal to obtain an integrated representation of the differential signal; and
sampling the integrated representation of the different signal based on the amplified differential signal.

23. The method of claim 22 comprising:
determining a comparison of the integrated representation of the differential signal to at least one threshold value in response to the sampling; and
determining a symbol length of a symbol included in the plurality of symbols based on the comparison.

24. The method of claim 22 comprising:
receiving the differential signal via receiving logic, amplifying the differential signal via amplifier logic, integrating the amplified differential signal via integration logic, and sampling the integrated representation of the different signal via sampling logic;
wherein the receiving logic, amplifier logic, integration logic, and sampling logic are included in a system on chip (SOC) integrated circuit within a user endpoint device, the SOC coupled to a radio and antenna and a controller to receive input from a touch enabled display of the user endpoint device.

* * * * *